United States Patent Office 2,946,821
Patented July 26, 1960

2,946,821

PURIFICATION OF M-PHENYLENEDIAMINE

Leslie M. Schenck, Westfield, and Dennis L. Deutsch, Cranford, N.J., assignors to General Aniline & Film Corporation, New York, N.Y., a corporation of Delaware No Drawing. Filed Oct. 5, 1956, Ser. No. 614,046

4 Claims. (Cl. 260—582)

This invention relates to a new and improved method for purifying a m-phenylenediamine, and is particularly concerned with an improved method of separating m-phenylenediamine from traces of the isomeric o- and p-phenylenediamines, whereby a product of high purity may be obtained in a more economic manner than heretofore.

This application is a continuation-in-part of our application Ser. No. 528,110, filed August 12, 1953, and now abandoned.

Briefly stated, the process of the present invention resides in our discovery that m-phenylenediamine, such as that obtained by reducing a commercial grade of m-dinitrobenzene by the conventional Bechamp, or other known reduction method, can be separated from the isomeric ortho- and para-phenylenediamines, which are present as impurities, by treating the impure phenylenediamine with salts of heavy inorganic metal, such as, copper sulfate, nickel chloride, cobalt nitrate, etc., and removing any precipitate that may form, either by filtration, centrifuging or the precipitate, if heat stable, may be left behind on the distillation of the m-phenylenediamine. The m-phenylenediamine thus obtained is essentially free of o- or p-isomers, or their by-products, and, after distillation, yields a practically colorless product stable to heat, light and air, and of good purity.

While m-phenylenediamine, contaminated by some of the o- and p-isomers, when freshly distilled is substantially colorless, it darkens rapidly on exposure to air, heat or light, and ultimately, becomes tarry. In addition to the reduced stability to air, heat and light, the presence of o- and p-isomers in m-phenylenediamine interfere with many uses of the m-phenylenediamine. Thus, the o- and p-isomers, because of their strong reducing action, cause decomposition of diazonium compounds. Hence, if impure m-phenylenediamine is used as a component for azo dyes, persistent foaming is encountered in the coupling reaction because of the generation of nitrogen. Furthermore, the decomposition products of the diazonium compounds contaminate the dye and lower yields are obtained. There may be cited, as a prime example of this observation, the manufacture of Dianil Brown 3 CN, and Direct Black EW, as described by Fierz-David and Blangey, "Fundamental Processes of Dye Chemistry," 1949, pages 288 to 292.

m-Phenylenediamine,, once prepared, can be separated from its isomers only with great difficulty and only a small amount of the o- and/or p-isomers in the meta compound is sufficient to reduce its stability. The separation by distillation is not feasible commercially, due to the close boiling points of three isomers; o-isomer=258° C.; p-isomer=267° C.; m-isomer=284° C. ("Lange Handbook of Chemistry," 1946, Handbook Publishers, Inc., Sandusky, Ohio). It is well known to the art that each of the isomers can be purified by recrystallizing the corresponding mineral acid salts, including the hydrochloride, sulfate or nitrate. This method is of too great expense to appeal to commercial manufacture (Org. Synthesis Cd., vol. II, p. 502).

Accordingly, the most practical method heretofore available for producing pure m-phenylenediamine has been to employ an extremely pure m-dinitrobenzene. However, the preparation of m-dinitrobenzene, which is uncontamined by the o- and p-dinitrobenzene is, itself, quite difficult. The dinitrobenzene is normally prepared by the nitration of nitrobenzene, and its preparation is well known in the art, suitable methods for the preparation of dinitrobenzene being described, for example, in the following references: BIOS 1144; BIOS 986, pages 117; P.B. 25, 263; Fierz-David and Blangey, "Fundamental Processes of Dye Chemistry," 1949 (page 111). Nitration of nitrobenzene, in accordance with these known processes, always yields, in addition to m-dinitrobenzene, 5–15% of ortho and para isomers, the quantity of these being larger, the higher the temperature (O. Wyler, Helv. Chim. Acts, 15, 23 (1932).

It is of utmost importance that these isomers be removed in order to obtain, on reduction, m-phenylenediamine which gives good yields of dyes and is, furthermore, stable to air, heat and light. For this reason, the accelerated reactivity of o- and p-dinitrobenzene, in respect to m-dinitrobenzene, is the basis of the commercial methods for purifying crude m-dinitrobenzene. The most common of these purification methods is the reaction of a crude m-dinitrobenzene with sodium sulfite or sodium bisulfite and caustic soda. By this operation, the bulk of the o- and p-isomers is converted to the nitrosulfonic acids, and then, through reduction, to the aminosulfonic acids which are water-soluble compounds and can consequently be easily removed (BIOS 1144; BIOS 986, page 117; P.B. 25623, page 346; Fierz-David and Blangey, "Fundamental Processes of Dye Chemistry," 1949, page 112). Other methods include the reaction with caustic soda or sodium alcoholates, yielding the corresponding phenol, anisol, or phenetol derivatives. The solidification point of the dinitrobenzene, as obtained from the nitration is usually 81–82° C. By purifying, using one of the above methods, the solidification point (S.P.) can be increased to 89–90° C. (M.P. 90.7–91.4° C., loc. cit.). To attain this higher degree of purity, a more energetic reaction with sodium sulfite caustic soda or alcoholates is required at a prohibitive expense in yield of the desired m-dinitrobenzene, since m-dinitrobenzene also reacts with any of the above reagents, but at a much slower rate. For this reason, commercial manufacture is limited to 88–89° C. S.P. material. Consequently, it is not commercially economical to produce m-dinitrobenzene of the extreme purity necessary to give, upon reduction, a pure and stable m-phenylene-diamine.

It is, therefore, the primary object of the present invention to provide a method of purifying m-phenylenediamine obtained by reduction of m-dinitrobenzene of a practical commercial degree of purity; such as the 88 to 89° C. S.P. material, mentioned above, which still contains, however, some of the o- and p-isomers.

The present invention is directed to the purification of m-phenylenediamine, rather than the preparation of the m-phenylenediamine, per se. The methods known in the art for the reduction of m-dinitrobenzene to m-phenylenediamine may be used, and suitable specific methods for its preparation have been described. For the sake of completeness, the following references to detailed specific procedures for its preparation are cited: P.B. 7036, page 6689; A. W. Hoffmann, Proc. Royal Soc. London II, 521, 12, 639; Schultz, Die Chemie des Steinkohlenteers, 4th edition, volume I, page 198; Pomeranz, G.P. 269, 542: Micewiez, Roczinki Chem. 8, 50; Fierz-David and Blangey, "Fundamental Processes of Dye Chemistry," 1949, page 115, and a detailed description of a typical process is given in Fierz-David and Blangey's book (loc. cit.). According to this process, m-dinitrobenzene is reduced with iron borings and dilute hydrochloric acid at temperatures of 95–100° C. Other processes use sulfuric acid, acetic acid or other acidic materials well known to the art. This type of reduction technique is commonly referred to as the Bechamp method. Furthermore, m-phenylenediamine can be prepared by catalytic reduction of the precursory dinitro compound, as well as by zinc reduction and/or various reductions known to the art.

The chemical behavior of the three isomeric phenylenediamines is well known to the art. It is reported that o-phenylenediamine will form addition compounds with metal salts, including $AgNO_3$ (Willstator, Pfannenstiel, Ber. 38, 2352); $CuCl_2$, $CuSO_4$, $Cu(NO_3)_2$, $ZnCl_2$, $CdCl_2$ and $CoCl_2$ (Hieber, Schlieszmann, Ries, Z. Anorg. Chem. 180, 100, 101, 226, 227, 228); $ZnBr_2$ (Wahl, Centr. I, 1929, 1432); $ZnI_2$ (Hieber, Appel, Z. Anorg. Chem. 196, 198); $SnCl_4$ (Hieber, Appel. Ann. 444, 262); $H_4Fe(CN)_6$ (Cumming, J. Chem. Soc. 123, 2463), and $NiCl_2$ (Feigl, Furth, Monatsh. 48, 446).

It is further disclosed that when nitrosoalkyldialkylaniline or toluidines are reduced by zinc in hydrochloric acid solution, or when aqueous solutions of mercury, zinc or cadmium salts are added to solutions of diamines, sparingly soluble compounds are formed (Imperial Chem. Ltd. and A. Riley, British Patent 297,989, Oct. 17, 1927). There is also reported that phenylenediamines and salts of cobalt, nickel and copper form amines (R. Cernatescu et al., Ann. Sci. Univ. Jassey 18, 385–403 (1933); loc. cit., 18, 404–414 (1933); loc. cit., 20, 154–172 (1934)). Hieber and Ries (Z. Anorg. Allgem. Chem. 180, 105–109 (1929)), postulate the following structural formula is obtained when o- and p-phenylenediamine are treated with zinc, cadmium and cobalt salts:

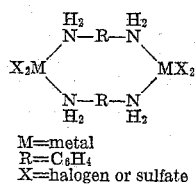

M=metal
R=$C_6H_4$
X=halogen or sulfate

Hieber and Ries state the metal compounds formed with p-phenylenediamine exhibit greater stability than those of the ortho isomer.

In a study of the stereochemistry of zinc, cadmium and copper (Wahl, III Nord. Kemistmotet, 172–6, 1928, Centr. 1929, I, p. 1432), it is disclosed that the complexes of o-, m- and p-phenylenediamine with these metals exist in neutral aqueous solutions as stable, slightly soluble compounds. Hieber and Wagener (Ann. 444, 256–65), report a study of compound formation between diamines and tin halides. Likewise, a study of the complex compounds of cobalt and phenylenediamines has been reported (Chem. Zentr. I, 609 (1926)). The use of copper sulfate in connection with analytical determinations of phenylenediamines is described by Kul'berg (Zhur. Anal. Khim. 2, 198; C.A. 43, 6945 (1949)). The Chemistry of chelation of the phenylenediamines is covered by Martell and Calvin in their book "Chemistry of the Metal Chelate Compounds" (Prentice-Hall Inc.; 1952).

In view of the teachings of the art, such as Kul'berg (loc. cit.) that both m- and p-phenylenediamine under similar reaction conditions precipitate by the addition of copper sulfate; and the claim of Wahl (loc. cit.) that he obtained with zinc or cadmium bromide, or copper salts, precipitates with all three isomeric phenylenediamines, which are very slightly soluble and stable; it would seem obvious, for example, that if a mixture of m- and p-phenylenediamine is treated with, say, copper sulfate, that both compounds will form stable complexes or precipitates. As a result, part of the m-phenylenediamine in solution would be removed as a metallic complex. Likewise, it would be anticipated from the teachings of the literature that treatment of a mixture containing m- and o-phenylenediamine, or a mixture of the three isomeric phenylenediamines, with salts of heavy metals, would behave in a similar manner.

Contrary to expectation, we have found that, after reducing a commercial grade of m-dinitrobenzene (S.P. 88–89° C.) by one of the previously cited methods, m-phenylenediamine can be purified by a heavy metal inorganic salt treatment without removing the m-phenylenediamine itself. In spite of the teachings of the prior art, we found that, when a mixture of the o-, and p-isomers of phenylenediamine is treated with heavy metallic salts, the o- and p-isomers of the phenylenediamine, complexed with the heavy metal cation much more rapidly than the m-phenylenediamine with the result that the heavy metal complexes of the o- and p-phenylenediamine are formed and precipitated and can be separated before there is any substantial formation or precipitation of the heavy metal complex of m-phenylenediamine.

On adding an aqueous solution of a heavy metal salt to an aqueous solution of p-phenylenediamine, a complex of the p-phenylenediamine with the heavy metal is formed instantaneously, and precipitates. When the same thing is done with the o-isomer, a complex is formed and precipitated only a trifle slower, but still almost instantaneously; while when an aqueous solution of a heavy metal salt is added to an aqueous solution of m-phenylenediamine, at room temperature, no noticeable formation of a complex, and resultant precipitation, occurs until the product has been stored for some time. The formation of a complex of m-phenylenediamine can be speeded up by employing elevated temperatures; however, even at temperatures of 100° C., the formation is quite slow.

As a result, by adding a heavy metal salt to a mixture of o-, m-, and p-isomers of phenylenediamine, the complexes of the o- and p-phenylenediamine, with the heavy metal, can be formed and removed before there is any appreciable formation of the heavy metal complex of the m-phenylenediamine.

By operating in accordance with the present invention, we have discovered that, contrary to expectations, we can effect a purification by selectively removing the undesired o- and p-isomers from the commercially obtained m-phenylenediamine with little, if any, loss of the m-phenylenediamine itself. Thereby, we are able to prepare m-phenylenediamine in an extremely pure and stable form essentially free of isomers.

In recapitulation, our invention consists of reducing the commercial grade of m-dinitrobenzene, with a solidification point of 88–89° C., by the conventional Bechamp or any other standard reduction method, thereafter treating the resultant m-phenylenediamine (which, however, contains appreciable amounts of o- and p-phenylenediamine) with salts of heavy inorganic metals, such as copper sulfate, nickel chloride, cobalt nitrate, etc., and any precipitate which may form is then removed from the m-phenylenediamine by filtration, centrifuging, although, if the complex is heat stable, it may be left behind; or distilling the m-phenylenediamine. The m-phenylenediamine thus obtained is essentially free of o- and p-isomers, or their by-products, and, after distillation, yields a practically colorless product stable to heat, light and air, and of solidification 63.15 (the melting point, which is usually about 0.5° C. higher than the solidification point, has previously been cited to be 6.8° C.).

In order to illustrate the details of the present invention, the following specific examples of preferred embodiment thereof are given:

*Example No. 1*

Into a 2 liter steel kettle was charged 1,250 ccs. of water, 375 g. iron borings and 25 ccs. 20° Bé. hydrochloric acid. Heat to 95–97° C. and, while agitating fast, add in 6–7 hours 210 g. m-dinitrobenzene, having a S.P. of 88–89° C. When all in, hold at 96–98° C. for 1 hour longer. Then cool to 85° C. and add slowly 15 g. soda ash until the mixture is slightly alkaline and there is no more soluble iron present in the solution. Filter hot. Add to the filtrate at 65–70° C. 20 g. cupric sulfate and hold at this temperature for ½ hour longer. Filter hot. Wash the cake with some warm water. Thereafter, distill off the water and distill the crude product in vacuum (B.P.$_2$—128–132°). The yield is 112.3 g., or 83.3% of theory. S.P. of material—63.15° C.

*Example No. 2*

150 g. commercial m-phenylenediamine and 1,250 ccs. water are heated to 80° C. and at this temperature 25 g. nickel chloride are added. The solution is kept for ½ hour at 80–85° C. and filtered thereafter. After distilling off the water, the material is subjected to a vacuum distillation. The material thus obtained is practically colorless and stable to light, heat and air.

It will be understood that the foregoing examples are illustrative of the present invention, and that various modifications thereof will suggest themselves to those skilled in the art and may be made without departing from the present invention.

It will be apparent that other heavy metal salts may be employed with equal effectiveness, in place of the cupric sulfate, or nickel chloride, employed in Examples 1 and 2, above. By the term "heavy metal salts" we mean the salts of the metals to be found in the fourth and fifth orbit series of the periodic system of the elements. From an economic and commercial point of view, the salts of the elements, vanadium, manganese, iron, cobalt, nickel, copper and zinc—of the fourth orbit series and of silver, cadmium, tin and antimony—of the fifth orbit series, are of immediate interest. The chlorides, sulfates, acetates, nitrates, etc., are to be preferred.

For ease of operation, it is preferable to employ a water-soluble heavy metal salt, since the salt can then readily be added to an aqueous solution of the phenylenediamine, and the insoluble product formed with the o- and p-phenylenediamine. The amount of the heavy metal salt employed is not highly critical. However, it will be apparent that a molar amount, equivalent to the o- and p-phenylenediamine, should be used if the o- and p-isomers are to be completely removed. In practice, as indicated by the foregoing examples, an excess of the heavy metal salt over that theoretically required to react only with the o- and p-isomers, is preferably employed, in order to assure complete removal of the o- and p-isomers, even though they probably result in some formation of the complex of the m-phenylenediamine, and resultant loss. If it is desired, it is possible to form complexes in organic solution, or in the molten anhydrous state. However, from a practical and economic standpoint, the use of aqueous solutions is preferred, since in aqueous medium the formation of the complex and its removal can be effected at room temperature, at which little, if any, m-phenylenediamine is lost, since little, if any, of the heavy metal complex of m-phenylenediamine is formed at room temperatures; while, at the temperatures necessarily used, especially when working in the molten anhydrous state, there is less difference in the rate at which the heavy metal complex of the m-phenylenediamine is formed as compared with the rate of formation of the complex of the o- and p-isomers, with the result that there is an increased loss of m-phenylenediamine, due to increased formation of its heavy metal complex.

It will also be apparent that the process of the present invention can be used to purify, not only m-phenylenediamine, itself, but also m-phenylenediamine containing such substituents as halogen, alkoxy, hydroxy, alkyl, preferably lower alkyl, or aryl substituents. It will also be apparent that the process of the present invention can be employed to purify ring homologues of m-phenylenediamine, such as naphthalene, anthracene, tetralin, cyclohexylbenzenes, etc., containing two or more free amino groups. It may, also, be suggested that, by suitable modifications, which will be apparent to those skilled in the art, the present invention may be employed to purify o- and p-phenylenediamines and homologues, and simple substituted derivatives thereof, from m-phenylenediamine.

The temperature employed for forming any complexes of the o- and p-phenylenediamine is not highly critical. However, in order to form these complexes in a rapid manner, and without operating in organic solutions, in order to be sure of having a solution of the m-phenylenediamine, temperatures within the range of 50 to 100° C. are to be preferred. At lower temperatures, unduly dilute solutions are required, and, at higher temperatures, there may be a tendency for some decomposition to take place.

The temperature employed in practicing the present invention is not highly critical. However, since the greatest difference in the rate of formation of the heavy metal complex of the o- and p-phenylenediamines, as compared with the complex of the m-phenylenediamine, occurs at low temperatures, it is preferred to add the heavy metal salt to the mixture of isomeric phenylenediamines at about room temperature, since, by so doing, the complexes of the o- and p-phenylenediamines are formed and can be removed before there is any appreciable formation of the heavy metal complex of m-phenylenediamine. However, as indicated by Examples 1 and 2, above, the formation of heavy metal complex of m-phenylene diamine is not too great, even at temperatures in the order of 50 to 100° C., and, if desired, such temperatures may be employed, and, at times, may be slightly preferred, since, when operating in aqueous solution, it is possible to employ somewhat more concentrated solutions at these temperatures. Temperatures above 100° C., however, are definitely less preferred, since there is more loss of m-phenylenediamine; and, also, other possible decomposition (thermal) at such temperatures.

The precipitated heavy metal complexes of the o- and p-phenylenediamines are preferably removed prior to distillation, since a slight excess of heavy metal salt, over that theoretically required to completely react with the o- and p-isomers, is preferably employed, and at the temperatures employed for distillation, there is apt to be some formation of heavy metal complex of the desired m-phenylenediamine, with resultant loss of the m-isomer.

We claim:
1. A process of recovering m-phenylenediamine from a mixture of the same with its o- and p-isomers which comprises adding to an aqueous solution of a mixture of said isomeric diamines at a temperature below about 100° C., a water-soluble heavy metal salt selected from the group consisting of the chlorides, sulfates, acetates and nitrates of vanadium, manganese, iron, cobalt, nickel, copper and zinc to thereby form an addition product of said salt and the ortho and para-phenylenediamines instantaneously and which precipitates as formed, and separating said precipitated addition product from the m-phenylenediamine before any appreciable amount of addition product of said heavy metal salt with m-phenylenediamine is formed.

2. The process as defined in claim 1, wherein the treatment is effected at room temperature.

3. The process as defined in claim 2, wherein the heavy metal salt used is cupric sulfate.

4. The process as defined in claim 2, wherein the heavy metal salt used is nickel chloride.

References Cited in the file of this patent

Malitzki: Chemische Zentralblatt, vol. 97, part I, page 609 (1926).
Cernatescu et al.: Ann. Sci. Univ. Jassy, 18, pp. 391–414 (1933).
Poni: Ann. Sci. Univ. Jassy, 20, pp. 154–172 (1934).